United States Patent

MacDonell

[15] 3,654,741
[45] Apr. 11, 1972

[54] MANUFACTURE OF STRUCTURAL MEMBERS AND COMPONENTS

[72] Inventor: Murray MacDonell, Woking, England

[73] Assignee: Montague L. Meyer Limited, London, England

[22] Filed: Mar. 24, 1970

[21] Appl. No.: 22,360

[30] Foreign Application Priority Data

Mar. 27, 1969 Great Britain......................16,093/69

[52] U.S. Cl..............................................52/720, 52/734
[51] Int. Cl. .........................................E04d 3/36, E04d 3/42
[58] Field of Search ............................52/720, 736, 732, 734

[56] References Cited

UNITED STATES PATENTS

| | | | |
|---|---|---|---|
| 1,460,090 | 6/1923 | Baehr | 52/720 |
| 2,113,322 | 4/1938 | Henderich | 52/734 |
| 2,382,208 | 8/1945 | Corbin | 52/730 |
| 3,396,504 | 8/1968 | Oliveira | 52/608 |
| 2,951,701 | 9/1960 | Gerritsen | 52/720 |
| 3,495,369 | 2/1970 | Laroche | 52/608 |

FOREIGN PATENTS OR APPLICATIONS

| | | | |
|---|---|---|---|
| 24,405 | 6/1901 | Switzerland | 52/730 |
| 33,871 | 6/1905 | Switzerland | 52/730 |
| 571,021 | 2/1959 | Canada | 52/730 |
| 375,871 | 4/1964 | Switzerland | 52/730 |
| 659,780 | 7/1964 | Italy | 52/608 |

*Primary Examiner*—Frank L. Abbott
*Assistant Examiner*—Leslie A. Braun
*Attorney*—Bacon and Thomas

[57] ABSTRACT

An identical pair of bar-like structural components of novel shape may be produced from a straight length of timber of rectangular cross section by severing it lengthwise. The length of material may be mounted on a carriage arranged to feed the material axially forward in a straight line past a band saw, such carriage being capable of rocking about the axis which passes through the geometric center of the cross-section of the material, and so rocking he length relative to the saw blade about such axis that the saw divides the top and bottom surfaces into the two components, having complementary opposed convex and concave edges. The two resulting components are then secured together as by gluing to produce a composite beam the strength of which is greatly in excess of the strength of the original unsevered length of timber. Composite beams may be produced by assembling four identical components in pairs back to back. Components of similar shape may be formed in other materials by moulding so as to possess comparable strength characteristics, according to the nature of the material. A panel may be stiffened by securing to its under side a number of components so formed.

13 Claims, 39 Drawing Figures

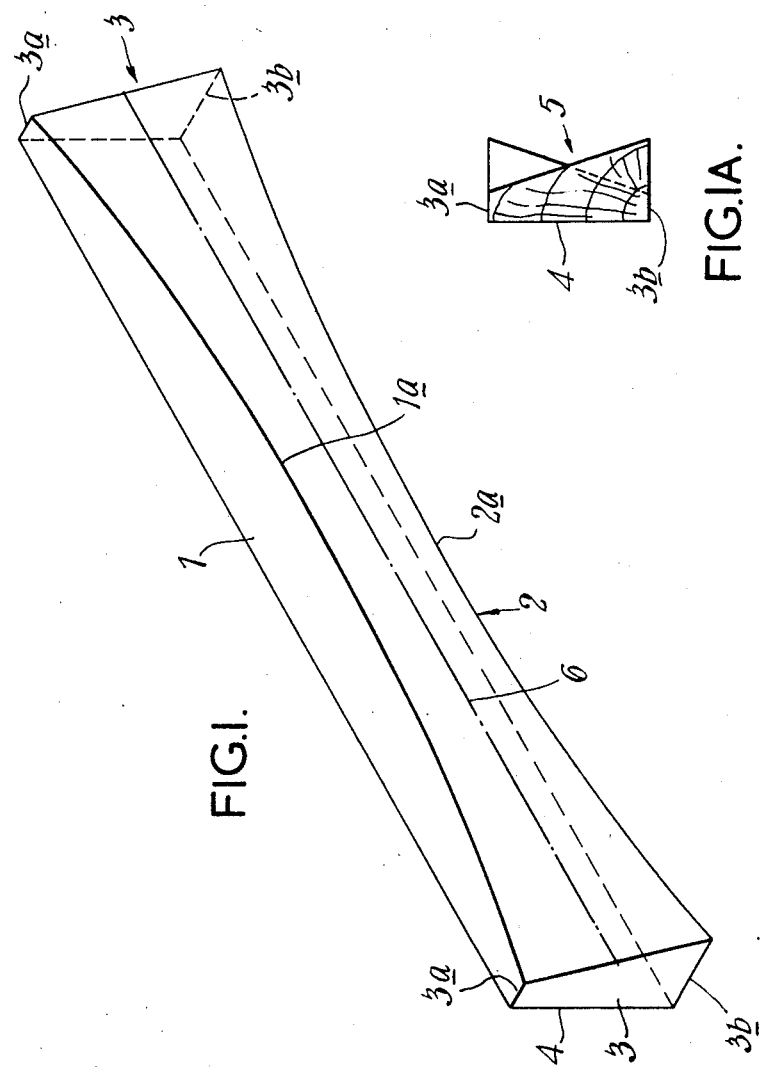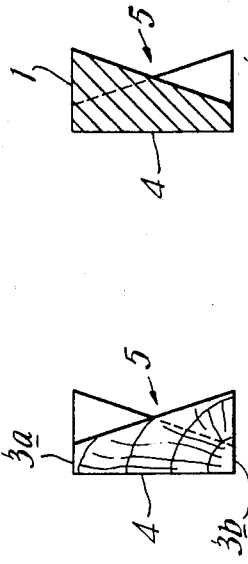

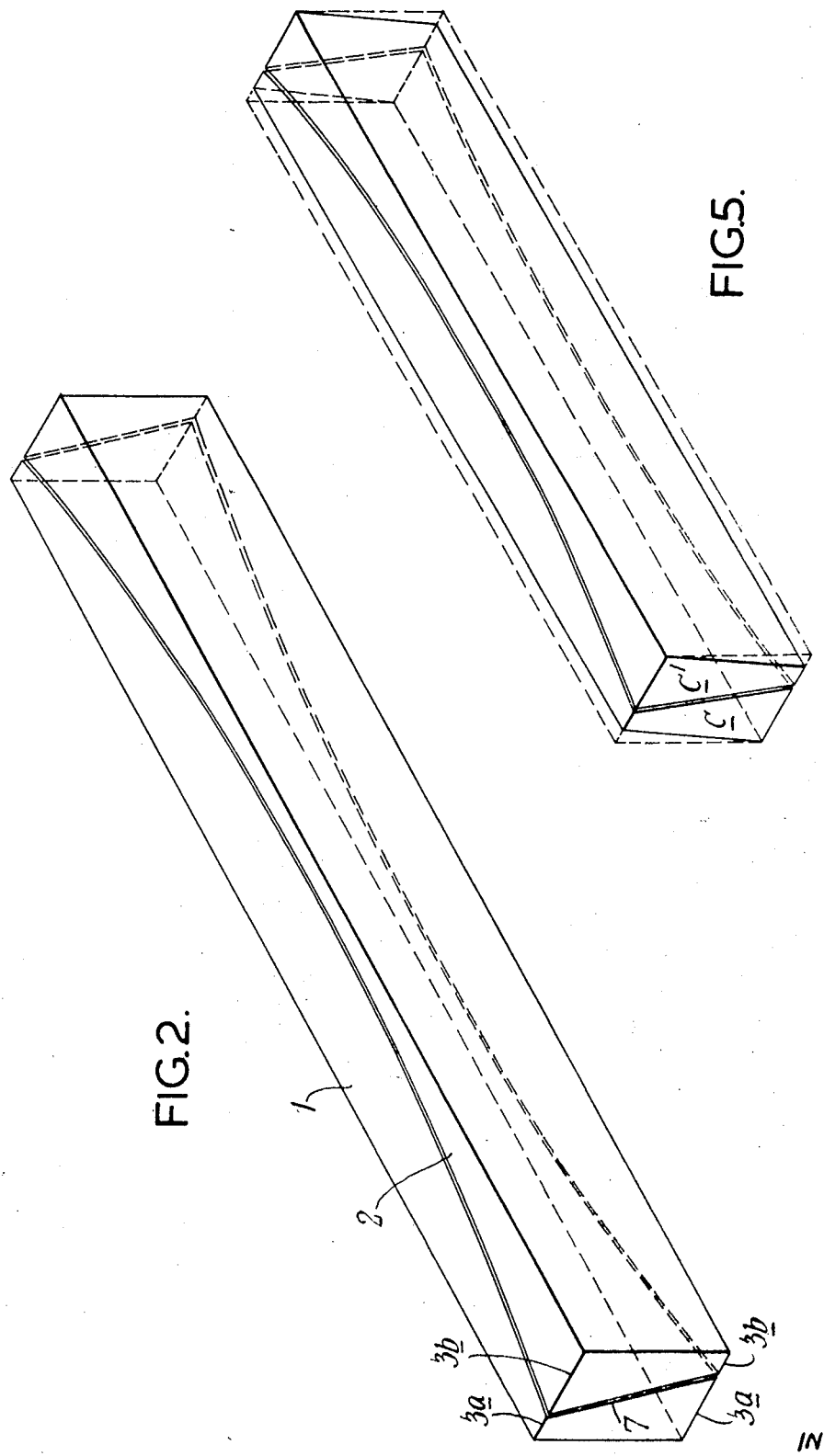

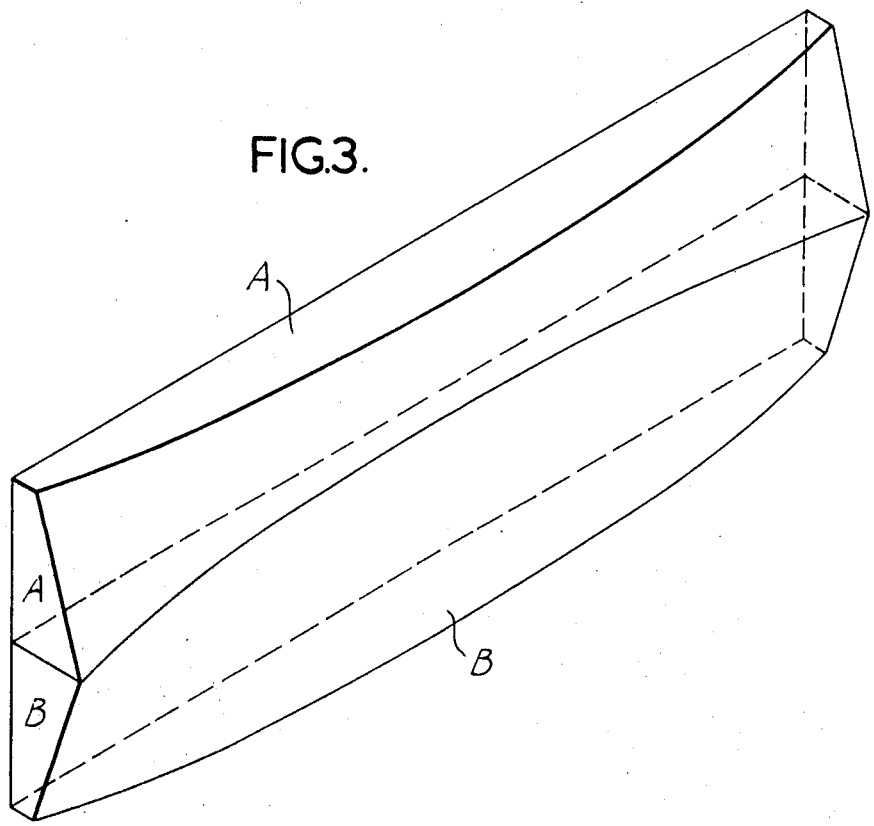
FIG.3.
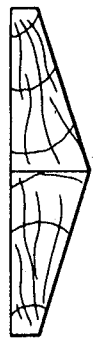    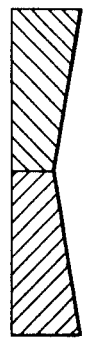    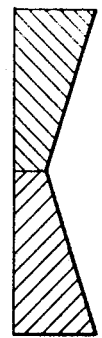
FIG.3A.          FIG.3B.          FIG.3C.

INVENTOR
MURRAY MACDONELL
BY
*Bacon & Thomas*
ATTORNEYS

INVENTOR
MURRAY MACDONELL
BY Bacon & Thomas
ATTORNEYS

INVENTOR
MURRAY MACDONELL
BY
*Bacon & Thomas*
ATTORNEYS

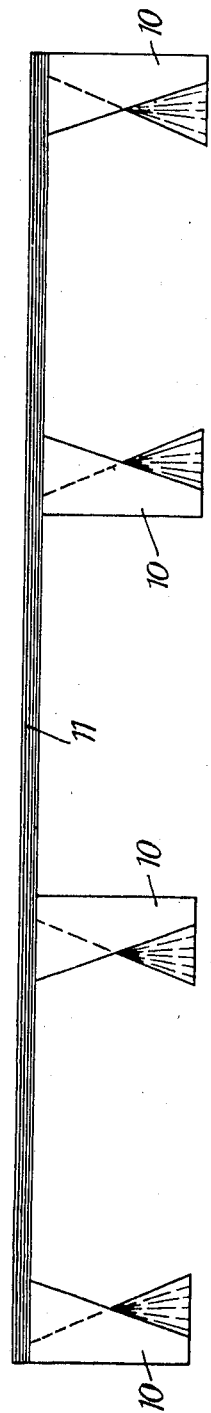
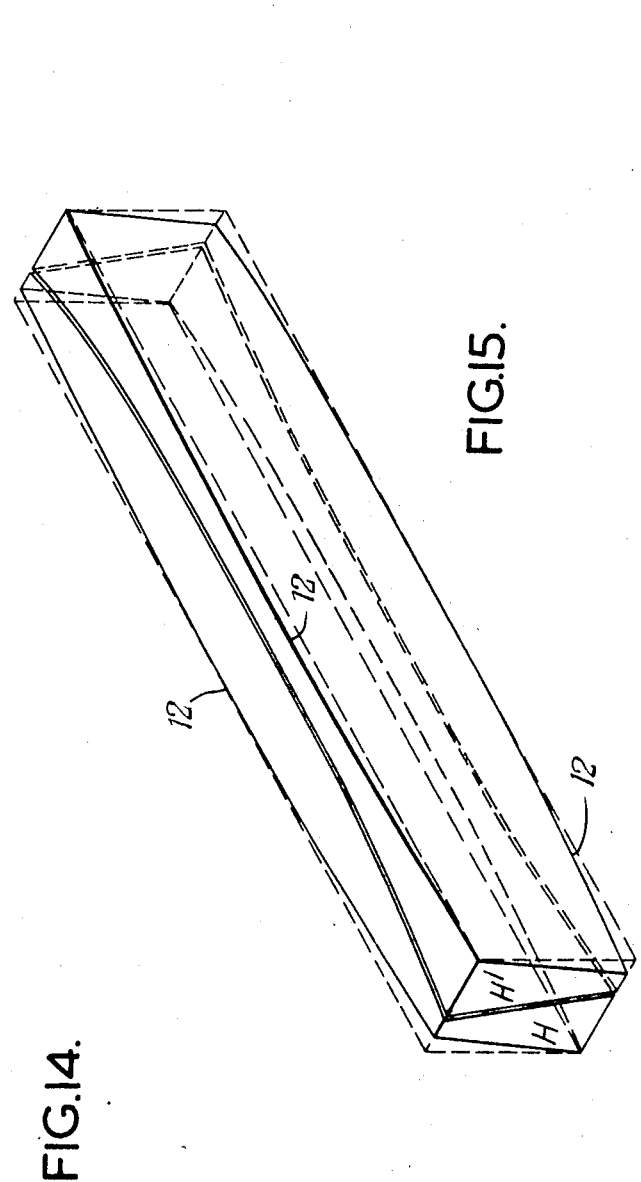
FIG.14.
FIG.15.

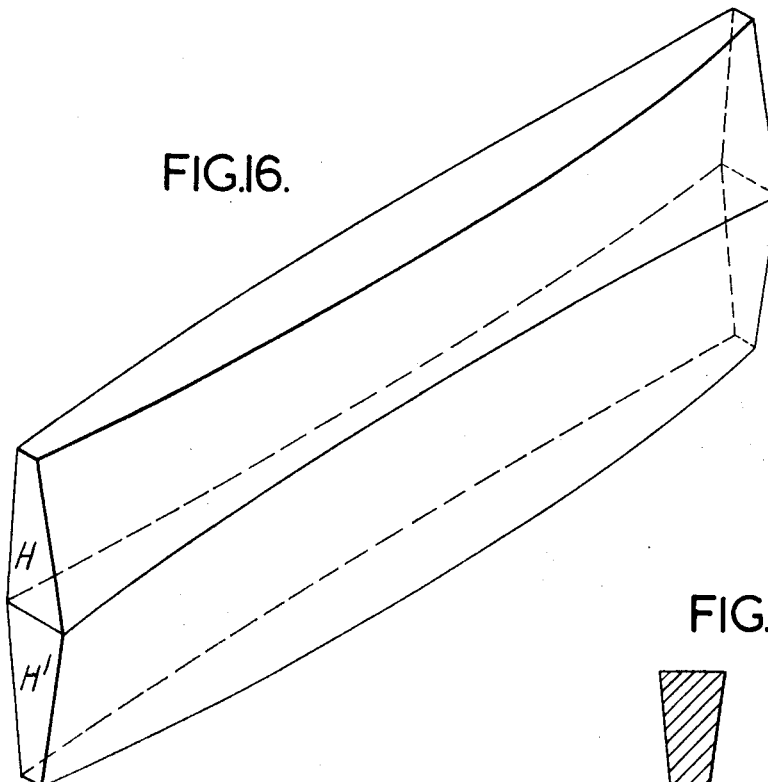
FIG.16.
FIG.16B.
FIG.16A.
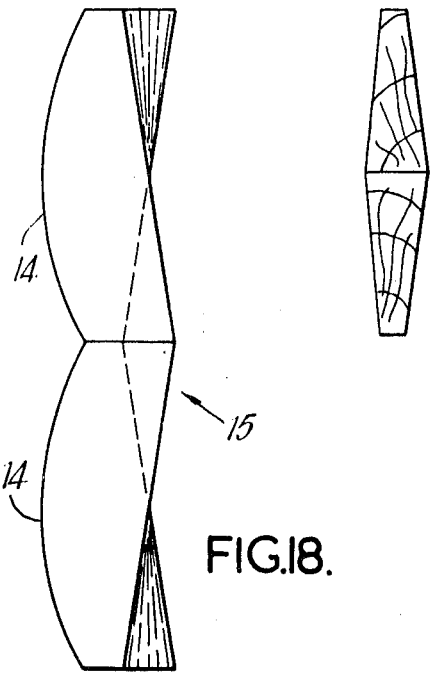
FIG.17.
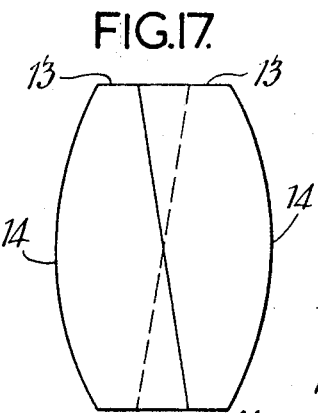
FIG.18.
INVENTOR
MURRAY MACDONELL
BY
Bacon & Thomas
ATTORNEYS INVENTOR
MURRAY MACDONELL
BY
Bacon & Thomas
ATTORNEYS

MANUFACTURE OF STRUCTURAL MEMBERS AND COMPONENTS

This invention relates to structural members in the nature of beams, and to methods for producing them economically.

It is recognized that, in the majority of instances, the use of a solid beam of constant cross section involves uneconomical use of material. This applies particularly to timber beams. In order to provide adequate resistance to the anticipated loading on a beam of constant cross section extending between supports at each of its ends, a section has to be chosen which will resist the maximum bending moment.

Generally speaking, for a beam supported at its ends and carrying a uniformly distributed load, the maximum bending moment occurs at the ends of the beam. It can be shown by a mathematical calculation that a beam of constant depth requires to have maximum cross sectional width at its upper and lower surfaces, to resist bending moments, and to have maximum width at its center of depth, to resist shear. A beam involving economical use of material will therefore require, maximum width at the upper and lower surfaces and near the center of its span and maximum width at the center of depth at and near its ends.

The present invention aims to provide a solid beam having these characteristics, and made either as a composite assembly from similarly shaped components, or made by casting or moulding. It further aims to provide an economic method of making such a beam and components, by cutting from solid lengths of material (normally timber), and of making moulds for the manufacture of such beams when they are to be formed by casting.

The invention is based on, and developed from, the discovery that it is possible to cut a normal rectangular section timber beam lengthwise, so as to sever it into two complementary and substantially identical halves of unusual shape, such halves constituting bar-like members which, when firmly assembled together, will provide a composite beam of the same length but with greatly improved bending strength.

According to the present invention there is provided a bar-like member for structural purposes, having a top and bottom surface, two end surfaces and two side surfaces, and in which the top and bottom surfaces are flat surfaces at least one of which lies in a (notional) horizontal plane and both of which lie in planes perpendicular to the (notional) vertical plane; one of those flat surfaces progressively increasing in width from both ends to a maximum at substantially the mid-position of the member's length so that, in plan view, that surface is substantially symmetrical about that mid-position and has a substantially convex edge; the other of those flat surfaces progressively decreasing in width from both ends to a minimum at substantially the mid-position of the member's length so that, in plan view, that surface is likewise substantially symmetrical about that mid-position but has a substantially concave edge located at the same side of the member as the said convex edge; while the side surface which is bounded by edges of the two ends and by the convex and concave edges (herein called "the principal side surface") contains a straight line (herein called "the basic line") running from end to end of the member and located substantially mid-way between the convex and concave edges, the principal side surface also being so shaped that any line perpendicular to the basic line and running from the convex edge to the concave edge is straight.

Preferably, the curvature of the convex edge matches, and is complementary to the curvature of the concave edge. In most cases, the top and bottom surfaces will lie in planes which are parallel in both directions, though in some instances those surfaces may lie in planes which are parallel in one direction and convergent/divergent in the other direction. In cases where members are to be assembled back to back (as hereinafter described the side surface opposite to the principal side surface is a flat surface, which lies in the plane perpendicular to the planes of the top and bottom surfaces.

The invention includes a method of making a pair of bar-like members as set forth above, by severing with a longitudinal cut, a length of solid material, such as timber, of substantially constant cross section, and which has flat top and bottom surfaces, in such a manner as to divide it into two such members or components which, if left undisturbed have their respective interfitting principal side surfaces opposed, and meeting at a notional interface resulting from the movement of the line of cut through the length of solid material.

Various embodiments of the invention will now be described by way of example only, and with reference to the accompanying illustrative drawings. It is pointed out that in all the Figures the lengthwise dimensions of the members of components, and of the beams formed from such components, have been deliberately shortened relative to the other dimensions, in order to illustrate curvature more clearly.

IN THESE DRAWINGS

FIG. 1 is an isometric view of a typical member in accordance with the invention, while FIGS. 1A and 1B are respectively an end elevation and a mid-point section of the same member, viewed from the left of FIG. 1.

FIG. 2 is an isometric view of a rectangular section showing the line of cut required to produce members in accordance with FIG. 1.

FIG. 3 is an isometric view of an assembly of two members in accordance with FIG. 1 to produce a composite beam.

FIG. 3A is an end view of the composite beam of FIG. 3, while FIGS. 3B and 3C are sections at its quarter points and mid-points respectively.

FIG. 5 is an isometric view which illustrates a method of cutting a length of material of which the cross section is a parallelogram.

FIG. 14 shows a stiffened panel, utilising members in accordance with FIG. 1 as stiffeners.

FIG. 15 is an isometric view which shows how the method of the invention may be applied to sever, in its longitudinal direction, a length of material which initially has two outer side surfaces similar in shape to the principal side surface previously defined.

FIG. 16 shows an isometric view of a composite beam formed by assembling components produced from FIG. 15.

Figure 4:
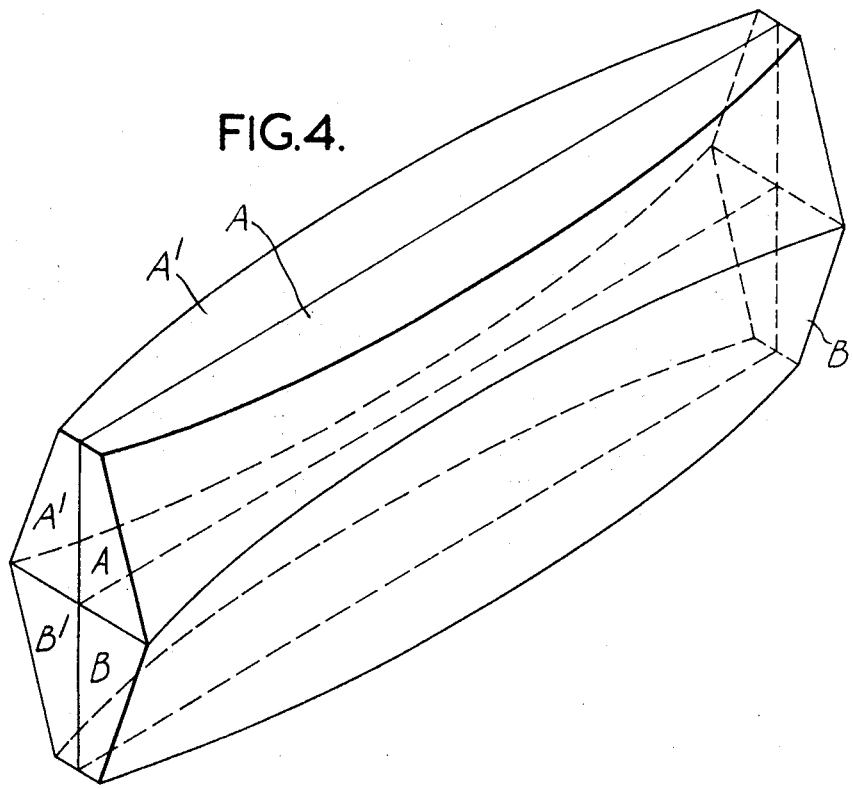
FIG. 4 is an isometric view of a composite beam made by assembling two composite beams of the kind illustrated in FIG. 3 in a back to back position.

FIGS. 16A and 16B respectively show the end view and center section of the composite beam of FIG. 16.

FIG. 17 is an end view which shows how the method of the invention may be applied to sever a length of material having parallel top and bottom faces, but otherwise barrel shaped in cross section.

FIG. 18 shows an end view of a composite beam formed by assembling two members formed from FIG. 17.

FIGS. 19 to 22 are diagrams which illustrate comparative calculations of maximum second moment of area of the cross section at mid-span of beams of varying section.

Referring to FIGS. 1, 1A and 1B, which illustrate the basic concept underlying the invention, the bar-like member shown in perspective in FIG. 1 has a top surface 1 and a bottom surface 2, both of which are flat surfaces, and in this example, lie in parallel planes. These planes are perpendicular to the vertical plane of the side 4 of the member. The two ends 3 lie in parallel planes perpendicular to the surfaces 1, 2 and 4. The top surface 1 gradually increases in width in a fair curve from its two ends 3 to a maximum at substantially the mid position of the member, so that in plan view that surface is substantially symmetrical about that mid-position, and has a substantially convex edge 1a. The bottom surface 2 progressively decreases in width in a fair curve from both ends 3, to a minimum at substantially the mid-position of the member, so that in plan view that surface is also substantially symmetrical about that mid position, but has a substantially concave edge 2a.

In this embodiment, the curves at the edges of the top and bottom surfaces are of identical curvature but reversed, one being concave and the other convex, and the end edges 3a of the top surface 1 are equal in width to each other and are also equal to the narrowest width of the bottom surface 2, while the end edges 3b of the bottom surface 2 are likewise equal in width to each other and are also equal to the widest width of the top surface 1. As a result of this arrangement, the basic line 6 which is shown in chain dots in FIG. 1, lies at the mid height position of the curved surface of principal side surface 5 of the member.

FIG. 2 shows how a length of material, whose total width is the sum of the edges 3a and 3b, can be divided by a saw cut 7 running lengthwise of the member, so as to produce two members of identical shape each in accordance with the shape shown in FIG. 1, and lying side-by-side with the surface 1 of the one member which has a convexly curved edge contiguous with the surface 2 of the other member which has a concavely curved edge and vice versa.

FIG. 3 shows a composite beam formed by assembling two members A and B, made by severing a length of material as described in relation to FIG. 2, and assembling the resulting components so that the surfaces having concave edges are contiguous. The end, quarter point and center sections of this beam are respectively illustrated in FIGS. 3A, 3B and 3C.

It will be appreciated that by comparison with the bending strength and stiffness of a rectangular beam of the total section of the member of FIG. 2 from which the two members A and B are formed, the bending strength and stiffness of the composite beam of FIG. 3 is very considerably increased without loss of material.

Figure 4A:
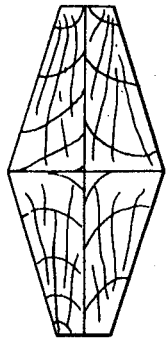
FIGS. 4A, 4B and 4C are respectively an end view, quarter point section and mid-point section of the composite beam of FIG. 4.
Figure 4B:
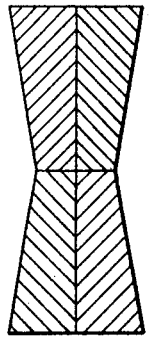
Figure 4C:
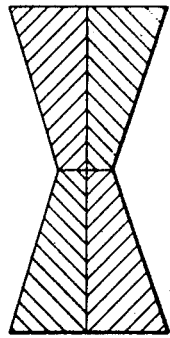

To produce an even stronger structure, two beam assemblies made in accordance with FIG. 3 may be secured back-to-back as illustrated in FIG. 4, in which four members A, A', B and B', are all secured together to produce a composite beam having approximately twice the bending strength and stiffness of the beam illustrated in FIG. 3. The end, quarter point and center sections of this beam are illustrated in FIGS. 4A, 4B and 4C respectively.

Figure 6:
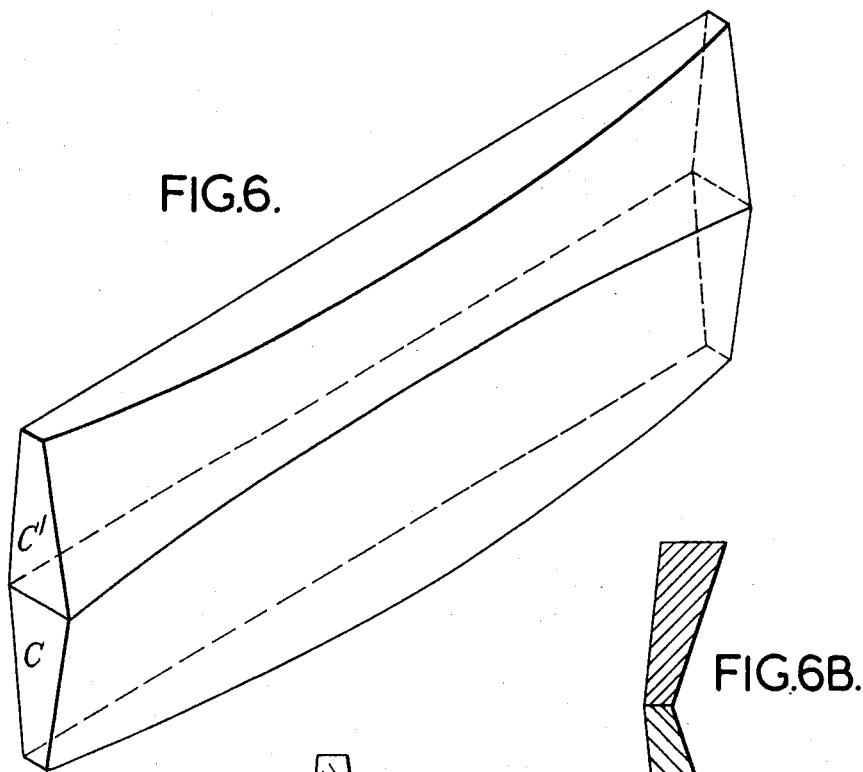
FIG. 6 is an isometric view which shows a composite beam made by assembling the two members produced from FIG. 5, while FIGS. 6A and 6B respectively show the end view and center section of the composite beam of FIG. 6.
Figure 6B:
Figure 6A:

FIG. 5 shows the effect of applying the method of the invention to a length of material of which the cross section is a parallelogram, to produce two identical members C and C' which are assembled as shown in FIG. 6, to form a composite beam generally similar to the beam of FIG. 3, but having and end shape as shown in FIG. 6A and a center section as shown in FIG. 6B.

Figure 7:
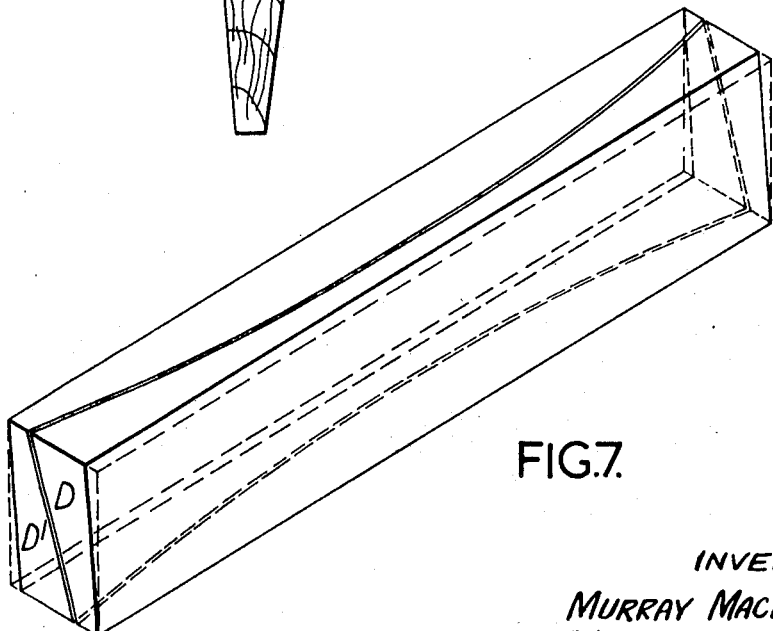
FIG. 7 is an isometric view which shows a method of cutting a length of material of which the cross section is a parallelogram but angled in the opposite sense to that of FIG. 5.
Figure 8:
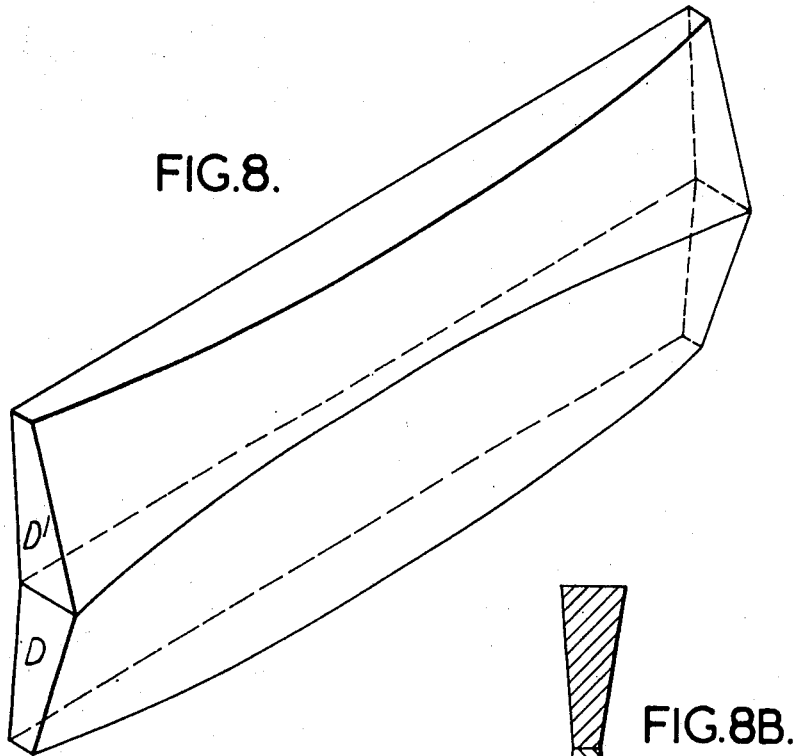
FIG. 8 is an isometric view which shows a composite beam made by assembling the two members produced from FIG. 7, while FIGS. 8A and 8B respectively show the end view and center section of the composite beam of FIG. 8.
Figure 8B:
Figure 8A:

FIG. 7 shows the affect of applying the method of the invention to a length of material of which the cross section is a parallelogram, angled in the opposite sense to, but cut in the same manner as, the cross section of FIG. 5, to produce two identical members D and D' which are assembled as shown in FIG. 8 to form a composite beam generally similar to the beams of FIGS. 2 and 6, but having an end shape as shown in FIG. 8A and a center section as shown in FIG. 8B.

Figure 10:
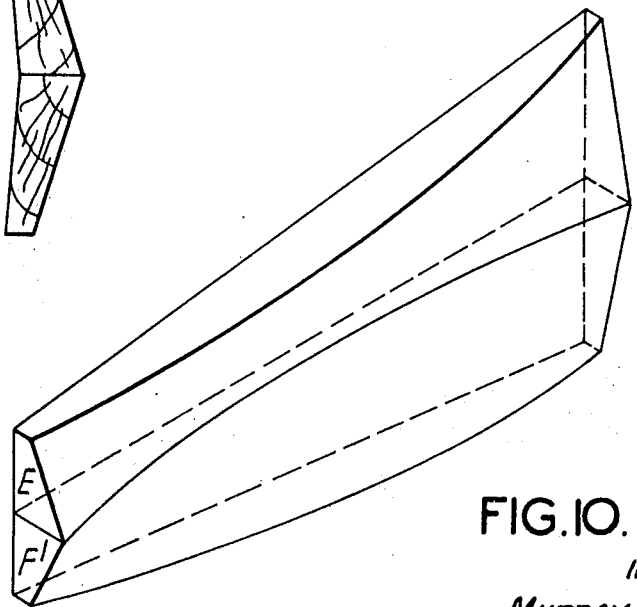
FIG. 10 is an isometric view which shows a composite beam produced from two of the members of FIG. 9.
Figure 9:
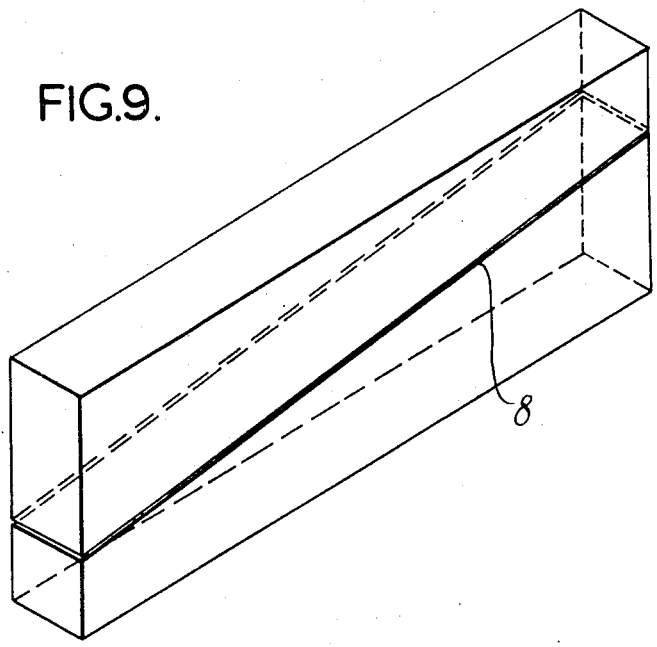
FIGS. 9 and 9A are isometric views which show how a length of material of considerable cross sectional depth in relation to its cross sectional width, may first be divided into two generally wedge shaped members, by a horizontal cut, and then sub-divided by the method of the invention.
Figure 9A:
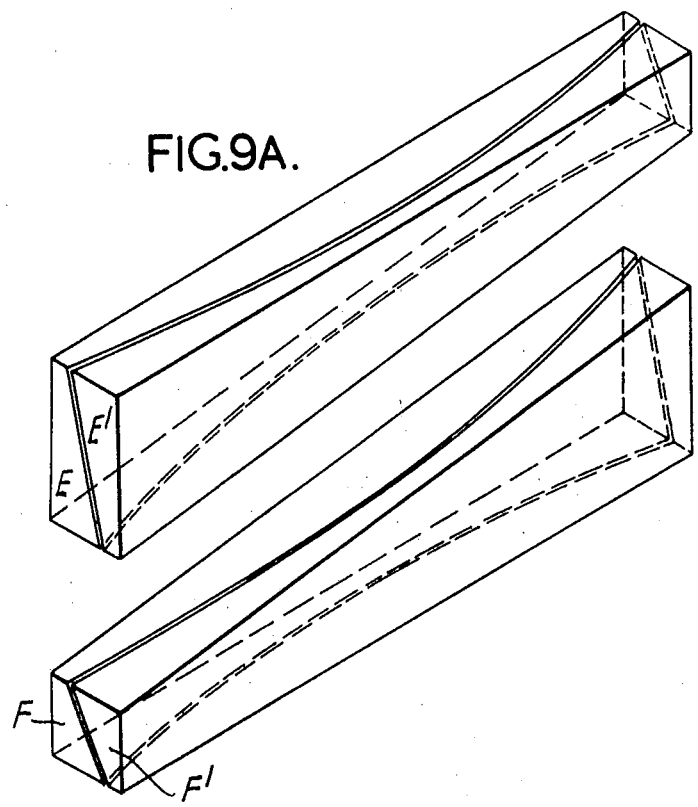

FIGS. 9 and 9A show a variant in which a length of material, of which the rectangular cross section is deep in relation to its width, is first divided into two identical wedge-like members by a straight cut on the line 8. These two members are subsequently sub-divided by the method of the invention so as to produce four identical members E, E' and F, F', which may be assembled as shown in FIG. 10, E with F' or E' with F to produce a composite beam of varying bending strength along its length.

Figure 11:
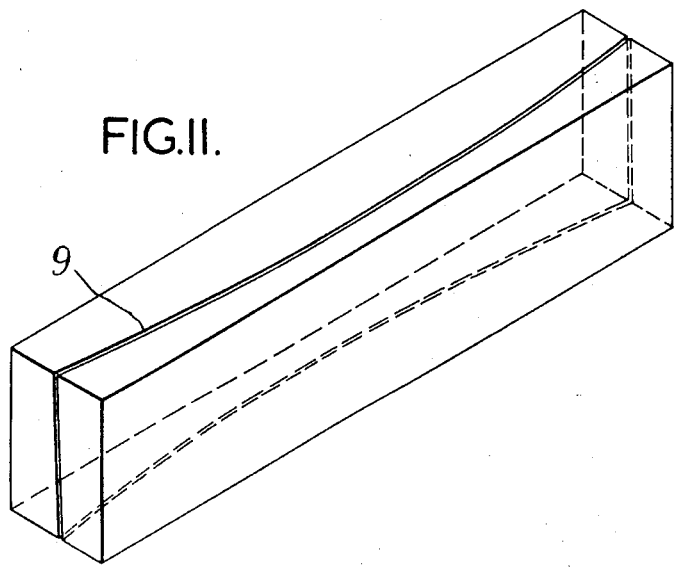
FIG. 11 is an isometric view which shows yet another way of severing a length of material.
Figure 12:
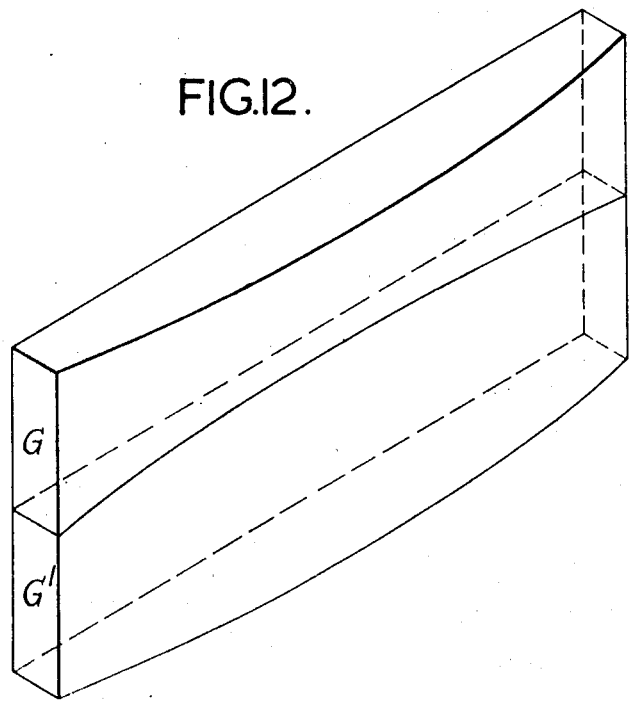
FIG. 12 is an isometric view which shows a composite beam made by assembling the two members produced from FIG. 11.

FIG. 11 shows yet another method of cutting a length of material of rectangular cross section, in which the saw cut 9 is initially in the vertical plane. This produces two identical members G, G' which may be assembled as shown in FIG. 12 to produce a composite beam.

Figure 13:
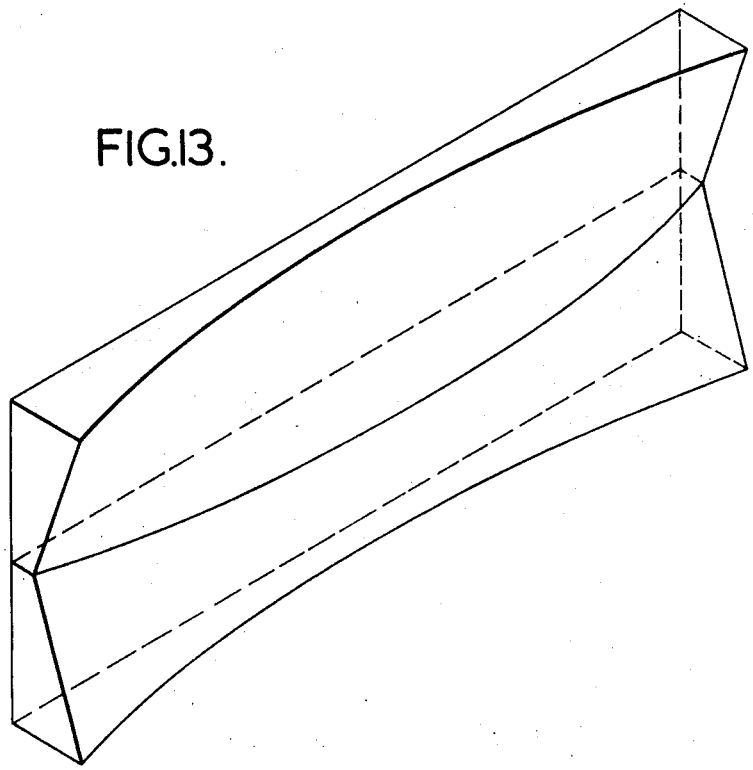
FIG. 13 is an isometric view of an assembly of two members in accordance with FIG. 1 to produce one side of a mould.
Figure 13A:
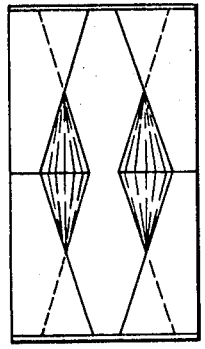
FIGS. 13A and 13B are respectively an end view and mid sectional view of a mould formed by erecting two members according to FIG. 13 opposite each other.
Figure 13B:
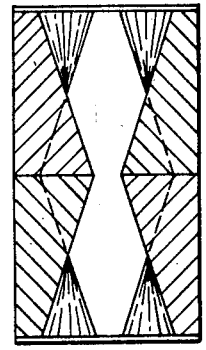

FIG. 13 shows a method of assembling two members produced as described in relation to FIG. 2, but so that the surfaces having convex edges are secured together to overlie one another. A member of this kind may be used as a mould, the conjoint principal side surfaces together forming a moulding surface. For example two such members of FIG. 13 may be erected, as illustrated in FIGS. 13A and 13B, opposite to each other to form a mould, FIG. 13A being a view of the end of the mould and FIG. 13B being a section at its mid-position. Material cast into the space between the mould, will result in a beam of the same configuration as that shown in FIG. 4.

FIG. 14 shows another use for the member of FIG. 1. In this example four members 10, each shaped as shown in FIG. 1, are secured to the underside of the sheet 11 to form a stiffened panel.

The invention is not limited to manufacture from lengths of material which are straight sided in a longitudinal direction.

FIG. 15 illustrates an example generally similar TO FIG. 5, but in which the edges 12 of the length of material are curved as can be seen in relation to the dashed lines on the Figure. A length of material of this shape when cut in accordance with the method of the invention into two identical members H and H', can be assembled as shown in FIG. 16 to form a composite beam, of which the end view and center section are respectively shown in FIGS. 16A and 16B.

Likewise, the invention is not limited to manufacture from lengths of material which are straight sided in a vertical direction.

FIGS. 17 and 18 (which are end views) illustrate an example similar to FIGS. 2 and 3, in which the length of material in cross section has parallel flat top and bottom surfaces 13 and barrel shaped side surfaces 14. When severed in accordance with the method of the invention the two identical members produced may be assembled as shown in FIG. 18, with the conjoint principal side surface 15 of similar shape to the principal side surface of the example of FIG. 3. The opposite conjoint surface 14.14 to the conjoint principal side surface, has a double curvature resulting from the juxtaposition of the two curved sides 14 of the two components.

It will be appreciated that the invention is principally applicable to manufacture from timber, and that the composite beams are preferably produced by using suitable adhesives between the adjacent surfaces, with or without additional fixings such as pins or screws.

Normally, rectangular section lengths of material will be used, and these may be severed as described with relation to the various examples, by mounting them on a carriage, arranged to feed each length axially forward in a straight line past a band saw, the carriage being capable of rocking the material about the axis which passes through the geometric center of the cross section of the material. The carriage is then arranged to rock as necessary relative to the saw blade, about that axis, so that the saw will divide the top and bottom surfaces of the material into shapes having complementary opposed convex and concave edges. In some cases the saw may rock relative to the carriage and/or the saw may be fed forwards through the material being cut.

FIGS. 19 to 23 are diagrams which relate to timber beams and illustrated the comparative second moments of area at mid-span of various typical cross sections of beam. In the diagrams the expression "I" represents the "second moment of area" of the beam, which may be used with other data to calculate strength and to give an approximate indication of stiffness.

The calculations for arriving at "I" have not been given in detail, as they are well known to structural engineers.

Figure 19:

In FIG. 19 there is shown a rectangular cross section of a timber beam having a width $w$ of 3⅞ of an inch and a notional depth $d$. In this instance the stiffness "I" equals $0.323\ d^3$.

Figure 20:
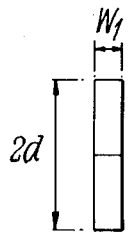

FIG. 20 shows a beam made by severing the section of FIG. 19 in the vertical plane into two equal halves of which the width $W_1$ is constant throughout and may be assumed to be fractionally less than half the width of the section from which it was cut (allowing for the loss of material due to the saw cut). This width $w_1$, may be assumed as 1⅞ inch. The total depth of this composite beam, which is glued together at the center, is $2d$. In this instance "$I$" = $1.25\ d^3$.

Figure 21:
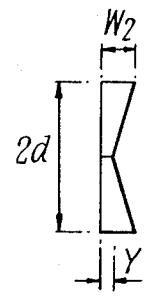

FIG. 21 shows a section at its mid-position of a composite beam in accordance with FIG. 3. This section in fact represents the section shown in FIG. 3C. The section has a depth $2d$ and a width $w_2$ at its extreme top and bottom surfaces and a width $y$ at its half height. In this case $I = d^3/6\ (y + 3w_2)$.

It will be appreciated that since the section has been cut from the basic section of FIG. 19 and allowing for a width of saw cut of ⅛ inch then $(w_2 + {}_y) = 3¾$ inch. If the width $y$ at half height is taken as ¾ inch and the width $w_2$ at the top and bottom surfaces is taken as 3 inch then $I = 1.625\ d^3$.

Figure 22:
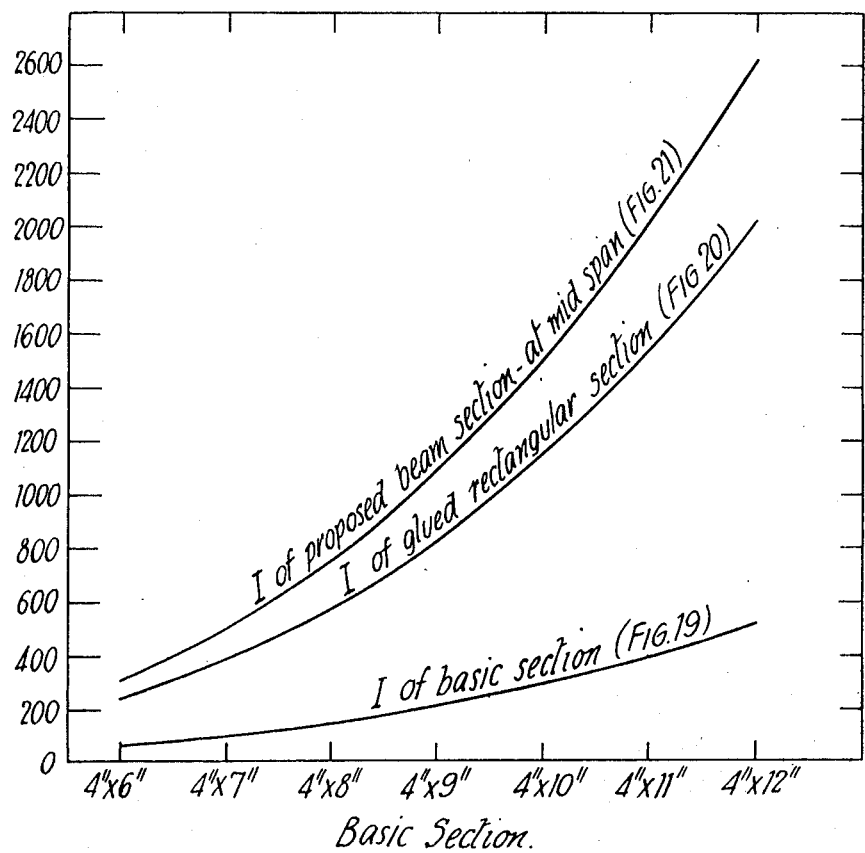

FIG. 22 shows curves which illustrate the varying "I" values of beams having cross sections similar to those of FIGS. 19 to 21, assuming the basic section of FIG. 19 to have the dimensions shown in the horizontal ordinates of the graph. The vertical ordinates represent the "I" value.

The section of FIG. 21 shows "I" value increase over the basic section of FIG. 19 of 403 percent, , and an "I" value increase over the composition section of FIG. 20 of 30 percent.

It is to be understood that, in the case of members cut from timber, the timber may either be solid or built up from glued timber laminates.

I claim:

1. An elongated structural member having a top and a bottom surface, two end surfaces and two side surfaces, and in which said top and bottom surfaces are flat surfaces at least one of which lies in a horizontal plane and both of which lie in planes perpendicular to a vertical plane extending longitudinally of said member; one of said flat surfaces progressively increasing in width from both its ends to a maximum at substantially the mid-position of said member's length so that, in plan view, such first flat surface is substantially symmetrical about such mid-position and has a substantially convex curved edge on one side of said member; the other of said flat surfaces progressively decreasing in width from both its ends to a minimum at substantially the mid-position of said member's length so that, in plan view, such second flat surface is likewise substantially symmetrical about such mid-position but has a substantially concave curved edge located at the same side of said member as said convex edge; the side surface between said curved edges containing a straight longitudinal line midway between said curved edges, said side surface being so shaped that any line perpendicular to said straight line and running from said convex edge to said concave edge is straight.

2. A member as claimed in claim 1, in which the curvature of said convex edge matches, and is complementary to, the curvature of said concave edge.

3. A member as claimed in claim 1, in which said top and bottom surfaces lie in parallel planes.

4. A member as claimed in claim 1, in which said top and bottom surfaces lie in longitudinally convergent planes.

5. A member in accordance with claim 1, in which the other side surface, opposite to said side surface, is a flat surface, which lies in a plane perpendicular to the planes of said top and bottom surfaces.

6. A structural assembly comprising two substantially identical assemblies as claimed in claim 5, assembled and secured together so that their respective conjoint flat side surfaces substantially coincide.

7. A structural member in the nature of a beam, comprising an assembly of two substantially identical components according to claim 1, the flat surface of each member having said concave edge being firmly secured to the corresponding surface of the other member, so that such surfaces substantially coincide.

8. A structural assembly comprising two substantially identical assemblies as claimed in claim 7, assembled and secured together so that their respective conjoint flat side surfaces substantially coincide.

9. A member having the external shape and surface configuration of the member of claim 7, but formed integrally by molding or casting.

10. A member comprising an assembly of two substantially identical components according to claim 1, the flat surface of each member having said convex edge being firmly secured to the corresponding surface of the other member, so that such surfaces substantially coincide.

11. A member according to claim 1 made from a length of timber.

12. A stiffened panel comprising a flat sheet of material reinforced by a bar-like member as claimed in claim 1.

13. A method of making a pair of structural members which comprises longitudinally severing a length of solid material of substantially constant cross section, which has flat top and bottom surfaces, by cutting therethrough along a line of cut extending from said top to said bottom surface, said line of cut being tilted relative to said surfaces at a predetermined angle at one end of said material, relatively tilting said material and line of cut as said line is moved longitudinally so that the line of cut progressively tilts relative to said surfaces to tilt in the opposite direction at the midlength of said material, then back to said predetermined angle at the other end of said material.

\* \* \* \* \*

UNITED STATES PATENT OFFICE
CERTIFICATE OF CORRECTION

Patent No. 3,654,741        Dated April 11, 1972

Inventor(s) Murray Macdonell

It is certified that error appears in the above-identified patent and that said Letters Patent are hereby corrected as shown below:

In the specification, column 5, line 30, $$I = d^3/6(y + 3w_2)$$ should read:

$$I = \frac{d^3}{6}(\underline{y} + 3\underline{w_2}$$

Signed and sealed this 12th day of September 1972.

(SEAL)
Attest:

EDWARD M. FLETCHER, JR.        ROBERT GOTTSCHALK
Attesting Officer               Commissioner of Patents